July 10, 1928.

B. McCOLLUM 1,676,619

METHOD AND APPARATUS FOR STUDYING GEOLOGIC CONTOURS

Original Filed Oct. 12, 1923

Burton McCollum
Inventor

Patented July 10, 1928.

1,676,619

UNITED STATES PATENT OFFICE.

BURTON McCOLLUM, OF WASHINGTON, DISTRICT OF COLUMBIA.

METHOD AND APPARATUS FOR STUDYING GEOLOGIC CONTOURS.

Application filed October 12, 1923, Serial No. 668,244. Renewed September 8, 1927.

My invention relates to methods of determining the contour of subterranean strata or boundaries of geologic formations and has among its objects the study of subsurface geological conditions at depths greater than can be conveniently and economically reached by means heretofore available. My invention is particularly adapted to determining the location of deposits of certain valuable minerals, mineral oils, and other valuable deposits which are more or less definitely related to subsurface geological conditions. My invention depends upon the broad principle of sending sound waves down into the portions of the earth to be studied and measuring the time intervals required for certain components of these sound waves to travel through certain well defined paths. These time intervals being known and the velocity of sound in the various subterranean rocks being determined once for all, the distances traveled by these sound components can then be determined. By properly utilizing this principle in the manner described below, I am able to determine much valuable information regarding the character and contour of the subsurface formation. Numerous attempts have been made heretofore to apply this principle, but owing to the difficulties described later, these attempts have not been successful. I have now discovered means of overcoming these difficulties and it is these discoveries that form the basis of the present specification.

My invention is fully described in the following specification, reference being made to the accompanying drawings.

Figure 3:
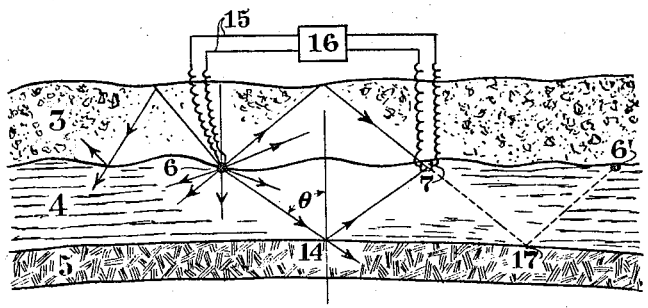
Figure 4:
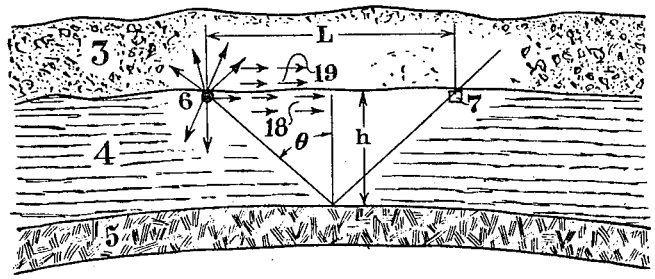

Figs. 3 and 4 serve to illustrate important features of my invention whereby I overcome certain natural difficulties and obstacles.

For the sake of clearness and brevity my invention is described below with particular reference to but one of its practical applications, namely, the study and the determination of the slopes of subsurface formations. It will readily be seen, however, that the method may be applied to determine geological contours under a great variety of other conditions.

It is well known that in regions where deposits of oil or gas may be encountered, these deposits are not distributed generally throughout the area but are highly localized in pools occupying a relatively small portion of the total area. The location of these pools is governed by a well known geological principle, namely, that they are associated with the anticlinal folds of the subsurface sedimentary rocks. A problem of great practical importance, therefore, is the determination of the location of these anticlinal folds and this is one of the important applications of my invention.

It will readily be seen that if one determines the direction of the slope of the rocks with respect to horizontal at various places, any reversal of the direction of this slope will mark the presence of an anticlinal or synclinal fold and a knowledge of the direction of the slope on either side of the fold will show also whether the fold is anticlinal or synclinal. The direct object of my invention, therefore, is the determination of the slope of subsurface strata in any desired locality.

Figure 1:
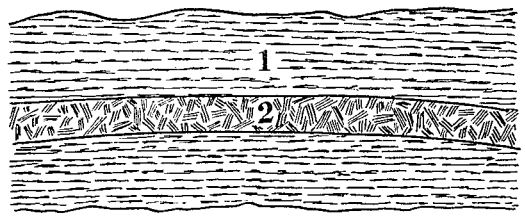
Fig. 1 is a diagram illustrating in a very elementary way the nature of the problem to be solved.
Figure 2:
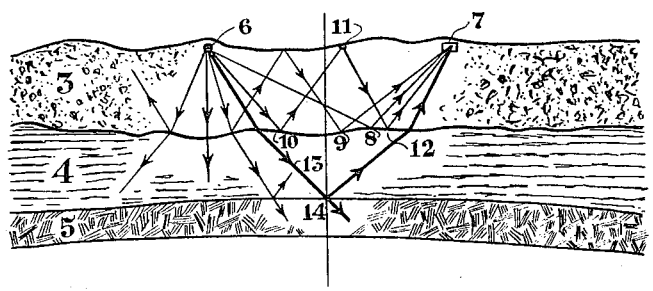
Fig. 2 illustrates certain practical conditions which are usually encountered in certain important applications of my invention.

Fig. 1 shows in its most simple and elementary form the nature of the problem with which we have to deal. Here a layer of surface rocks 1 overlies a layer of a different sedimentary rock 2. In general it is well known that in most cases the surface contour of the rock layer 1 bears no definite relationship to the contours of the subsurface strata, but that in general certain deeper rock layers 2, which in the case under consideration are more frequently of limestone or sandstone, the contours offer a fairly definite criterion of the contours of still deeper strata with which the oil deposits are associated. In the simplest form, therefore, the problem is one of determining the direction of the slope in any desired locality of the rock layer 2. This simple condition here described, however, is one which very seldom occurs in practice. In most cases the conditions are substantially equivalent to those shown in Fig. 2. Here a minimum of three geologic zones have to be taken into consideration. On the surface there is usually a layer of soil 3, comprising more or less completely disintegrated rock or unconsolidated deposits the depth of which varies greatly from point to point. Beneath this there is usually a zone 4 comprising unweathered shales and this in turn is underlaid by a rock layer 5, the slope of which it is desired to determine. Numerous investigators have attempted to study such geological conditions by what is known as the echo method, namely, by sending a sound wave down from the surface and measuring the time elapsing between the start of the transmitted wave and the arrival at the surface of a reflection or echo from the rock layer 5. This method, however, has failed to give reliable results under the practical conditions here disclosed. One reason for this is that the depth of the surface layer 3 is not only decidedly variable from point to point, but the velocity of sound in this layer is likewise extremely variable and uncertain. Variations of the velocity occur with depth and degree of disintegration of the rocks, moisture content, character of soil, and various other factors. Because of these variables the time intervals required for sound to go through these surface layers are difficult to determine with sufficient accuracy for practical purposes. Furthermore, the velocity of sound in this weathered layer is usually extremely low in comparison with the velocity in the unweathered rocks, so that the uncertain time interval required for the sound to travel through the surface layer forms a very large proportion of the total time for the sound to reach the rock layer 5 and return. Consequently it becomes out of the question to use this simple echo method under these conditions. I have discovered that the failures made in the past are due chiefly to this uncertain weathered layer, and have devised means and methods whereby the difficulties inherent in the echo method as heretofore used are entirely avoided and it is the means whereby I accomplish this that forms the subject of this specification.

Referring again to Fig. 2, let us suppose that a source of sound is placed at any point 6 near the surface, and a detector of sound waves at any point 7, likewise near the surface. This represents the procedure that has heretofore been followed in attempting to utilize sound waves for exploring subsurface geology. It will be evident that the sound waves traveling downward in all directions will encounter the boundary between the surface layer 3 and the subsurface layer 4 at which point a portion of the energy is reflected back as indicated by the arrows. I have found by experiment that the acoustic properties of the weathered surface layers corresponding to 3 differ radically from the corresponding properties of the unweathered rocks or shales 4. As a result of this it has been found that nearly all of the sound energy from the source 6 is reflected back at the top of the rock layer 4. This reflected energy is again reflected back downward from the surface and again upward at the boundary between 3 and 4, thus giving rise to an indefinite series of reflections from the top and bottom of the weathered layer 3. It will be evident that all of these numerous reflected waves will actuate the sound detector placed at 7. Furthermore, it will be seen that those waves which reach the detector 7 after a single reflection, as at the point 8, will reach the detector at a different time from the reflection at the point 9, because of the difference in the length of the path. Also as just pointed out, a reflected wave may reach the detector 7 after three reflections as at the point 10, then at the point 11, and again at the point 12. Obviously this disturbance reaches the detector at a considerably later time than either of the two foregoing. Similarly other reflected waves follow at still later times due to their having been reflected a greater number of times before reaching the detector 7. To add to the difficulty these reflected waves do not reach 7 as a series of detached pulses, the time intervals of which bear any definite relation to each other, on account of the irregularity of the boundary within the weathered layer 3 and the rock layer 4. In consequence of the foregoing phenomena the detector at 7 will continue to be disturbed for a prolonged interval by a series of sound waves, depending wholly on the acoustic properties, form and dimensions of the weathered layer 3 which, as is well known, bears no relation whatever to the depth or contour of the rock layer 5 which it is desired to determine. While it is true that a small part of the energy from the source does go down through the rock layer 4 as indicated by the arrow 13, and in turn a fraction of this is reflected back toward the detector at the point 14 from the boundary surface between 4 and 5, the intensity of these waves is so small in comparison with the waves reflected back from the boundary between 3 and 4, that they are entirely obscured by the complex series of phenomena taking place due to reflections at the base of the weathered layer. It is not, therefore in general possible to identify on a graphic record those waves which are reflected back from the rock layer 5 under investigation.

Having discovered the cause of the difficulty in the application of this method, I have found that it can be entirely overcome by placing the source 6 and the detector 7 down in the unweathered rock zone 4.

The essential principle of my invention will be understood by reference to Fig. 3. Suppose, for example, that the source is placed at the point 6 just below the boundary between the weathered layer 3 and the rock layer 4, the detector 7 being similarly located a short distance away, just below the same boundary. It will be evident that the sound passing out from the source 6 will go in all directions, some of it up into the weathered layer 3, but owing to the reflection at the boundary surface, most of it will be directed downward where a considerable portion of the energy is reflected back at the point 14 toward the detector 7. If now, we measure by any means the time interval between the generation of the sound wave at 6 and the arrival of the reflected wave at the detector 7, and further if we know the velocity of sound in the rock layer 4 together with the relative positions of the points 6 and 7, the position and therefore the depth of the reflecting point 14 can be readily calculated by well known procedure. It will be evident that by placing the source 6 within the rock layer 4, very close to the upper boundary, that not only will the energy starting downward be permitted to travel on to the rock layer 5, but the energy which starts upward will be in large part immediately reflected back downward at the boundary surface between 3 and 4 due to the great difference in their acoustic properties as explained above. In this way all but a small fraction of the total radiant energy will travel in the downward direction, so that the reflected portion reaching the detector 7 will be a very substantial part of the whole. Of the small amount of acoustic energy which does pass the boundary into the weathered zone 3, it is true that this will be reflected back downward as shown by the arrows, but it will be evident that these reflected waves which happen to be directed toward the detector 7 will be largely reflected upwards again at the boundary surface between 3 and 4, and will therefore not distrub the detector to any great degree. Therefore the difficulties described above, which have stood in the way of previous attempts to apply this principle are reduced to a practically negligible amount. The time interval elapsing between the starting of the energy from the source 6 and the arrival of the reflected wave at the detector 7 can be determined by any one of a variety of well known means. I prefer to use as a source 6 a charge of explosive with which is connected a wire forming a part of an eelctrical circuit 15, connected to a time recording device 16. A detector 7 is also connected to the same time recording device. The firing of the explosive breaks the electrical circuit 15 so that the time of firing the charge is instantly recorded on the time recording mechanism 16. Similarly the time of arrival of the reflected wave at the detector 7 is likewise recorded, and hence the difference in time is easily obtained. As a recording device I prefer to use an instrument based on the principle of the moving tape or film on which records are traced by pointers or spots of light actuated by the breaking of the circuit 15, by the shot and by the operation of the sound detector 7. An instrument based on the principle of the ordinary oscillograph I have found to be very effective and satisfactory for this purpose. The use of such an instrument for the measurement of brief time intervals is too well understood to require description here.

Having determined by the method indicated above, the position of the reflecting point 14 on the surface of the rock layer 5 with respect to the known locations of the source 6 and the detector 7, we now proceed to repeat the experiment with the source placed at some other point, as 6', whereupon the position of a second point of reflection 17 can likewise be determined. The detector 7 may be left in the fixed position or obviously it may be placed in a new position if desired. The positions of the points 14 and 17 being thus determined, the average slope of the curve of the rock layer 5 between these points obviously becomes known. The position of any number of points on the rock layer 5 can be determined in this way and its complete contour can be plotted.

There are some further very important advantages vital to the success of the method which can be realized by a proper placing of the sound source and detector relative to each other. One important consideration in connection with this is the following. If the detector is placed relatively close to the source, it will be very violently affected by the direct wave traveling from the source and the disturbance from this may be so intense that the after effects which always follow the firing of a charge of explosive in the earth may be so large as to obscure the feeble effects of the wave reflected from the point 14. This difficulty can be materially reduced by placing the detector at a proper distance in a horizontal direction from the source. In this way the intensity of the direct wave relative to that of the reflected wave is very materially reduced. A further consideration, however, is involved here. If the detector is placed at a considerable distance in a horizontal direction from the source 6, it will be evident that the wave will strike the reflecting surface of the rock layer 5 at a considerable angle. Now in general experience shows that the rock layers, such as 5, the contour of which it is desirable to determine in any potential oil bearing country, usually consist of limestone or sandstone in which the velocity of sound is much greater than that of the overlying shales represented by the rock layer 4. This being the case, it follows from the well known laws of propagation of radiant energy that if the direction of the incident wave 13 makes a sufficiently large angle with the normal to the surface of the rock layer 5, total reflection will occur; whereas if the angle is less than a certain critical value, only partial reflection will be obtained. It is well known that total reflection occurs if the sine of the angle of incidence is equal to or greater than the ratio of the velocity of sound in the rock layer 4 to that in the rock layer 5. If, therefore, the distance in a horizontal direction between the detector and the source is made such that the sine of the angle $\Theta$ is equal to or greater than $\frac{v_4}{v_5}$, or $$\sin \Theta \gtreqqless \frac{v_4}{v_5} \quad \text{------------} (1)$$

where $v_4$ is the velocity of sound in the rock layer 4, and $v_5$ the velocity in the rock layer 5, we will have the conditions for total reflection. We can, therefore, secure much stronger reflected waves on the detector 7 rendering it much easier to distinguish definitely the time of arrival of this reflected wave even in the presence of persistent after disturbances from the direct waves.

A still further advantage is, however, obtained from this peculiar arrangement which can best be understood by reference to Fig. 4. It will be seen here that as the sound wave travels out in all directions from the source 6, a certain amount of the sound energy travels horizontally in the upper portions of the rock layer 4 as shown by the arrows 18, and a certain other amount of energy travels in a direction approximately parallel thereto in the lower portions of the weathered layer 3, as shown by the arrows 19. It will be obvious that if these two waves travel at exactly the same velocity, and were of the same intensity, there would then be no tendency for either wave to give rise to diffraction effects into the adjacent medium. However, as pointed out above, the velocity of sound in the rock layer 4 is much greater than that in the weathered layer 3. Consequently the wave front of the wave represented by the arrows 18 will always be well in advance of the wave front of the wave in the weathered layer represented by the arrows 19. On this account there will be continual diffraction of sound energy from the upper portions of the rock layer 4 into the weathered layer 3, and in consequence of this the energy of this part of the wave is dissipated much more rapidly than if such diffraction effects did not occur. In other words, in addition to the intensity of this part of the wave diminishing according to the inverse square law, it also diminishes with great rapidity due to diffraction, and if the detector is properly placed with respect to the source, as shown above, in the rock layer 4 very close to the boundary between 3 and 4, this part of the direct wave can be made extremely feeble by the time it reaches the detector. In this way I have been able to obtain the result that the reflected wave from the rock layer 5, although traveling a much greater distance, will have, on arrival at the detector 7, a far greater intensity than that of the direct wave, thereby making it very easy to determine accurately the time of arrival of the reflected wave.

We now have sufficient data to determine the minimum distance in a horizontal direction between the source 6 and the detector 7, in order to secure the advantages described. From geometry it will be readily seen that this horizontal distance $$L = 2h \tan \Theta \quad \text{------------} (2)$$

where $h$ is the vertical depth of the rock zone 4. As explained above the sine of $\Theta$ must be greater than $\frac{v_4}{v_5}$ $$\sin \Theta \gtreqqless \frac{v_4}{v_5} \quad \text{------------} (1)$$

Solving equation (2) for sine of $\Theta$, and substituting this value in equation (1), we have $$\frac{L}{\sqrt{4h^2 + L^2}} \gtreqqless \frac{v_4}{v_5} \quad \text{------------} (3)$$

If now, we know approximately the depth $h$ of the rock layer 5, which can easily be determined with sufficient accuracy for this purpose by preliminary calculation, we can substitute this value in equation (3) and determine the minimum value of L to give the essential advantages described above.

I claim:
1. The method of determining the slope of a subsurface rock layer which is overlaid by a layer of undisintegrated rocks covered in turn by an unconsolidated stratum, said method comprising the placing of a source of sound and a detector of sound waves down in the said overlying undisintegrated rock, in known positions relative to each other, sending sound waves out from the said source, giving rise to reflected waves from the boundary of the said subsurface rock, receiving the said reflected waves at the said detector, measuring the time interval elapsing between the sending out of the sound wave from the said source and the arrival of the reflected wave at the said detector, calculating the depth of the said subsurface rock from the said measured time interval, and the known velocity of sound in the said overlying rock layer, and the known positions of said sound source and said detector.

2. The method of determining the slope of a subsurface rock layer which is overlaid by a layer of undisintegrated rocks covered in turn by an unconsolidated stratum, said method comprising the placing of a source of sound and a detector of sound waves down in the said overlying undisintegrated rock in known positions relative to each other, sending sound waves out from the said source, giving rise to reflected waves from the boundary of the said subsurface rock, receiving the said reflected waves at the said detector, measuring the time interval elapsing between the sending out of the sound wave from the said source and the arrival of the reflected wave at the said detector, the said detector being placed in such position relative to said source, that the angle of incidence of the sound wave reflected to the said detector from the said subsurface rock layer shall be such as to give total reflection.

3. An apparatus for determining the slope of a subsurface rock layer, which is overlaid by a layer of undisintegrated rocks covered in turn by an unconsolidated stratum, comprising two sound devices, one a source of sound waves, and the other a detector of sound waves, means for measuring the difference in time between the starting of a sound wave from the said source and its arrival at the said detector after reflection from the said subsurface rock layer, the said sound devices being placed within the boundaries of the said overlying undisintegrated rock.

4. In the art of determining the slope of a subsurface rock layer overlaid by a layer of undisintegrated rock covered in turn by an unconsolidated stratum, the method which comprises producing wave energy by a source located in said overlying undisintegrated rock, and determining at a point in said overlying undisintegrated rock the time interval between the emission of said wave energy from said source and the arrival thereat of the wave energy reflected from said sub-surface rock layer.

5. In the art of determining the slope of a sub-surface rock layer overlaid by a layer of undisintegrated rock covered in turn by an unconsolidated stratum, the method which comprises producing wave energy by a source located in said overlying undisintegrated rock, and determining at a point in said overlying undisintegrated rock the time interval between the emission of said wave energy from said source and the arrival thereat of the wave energy reflected from said sub-surface rock layer, said source and said point being so disposed with respect to each other that the angle of incidence of the wave energy reflected to said point shall be such as to effect total reflection.

In testimony whereof I affix my signature.

BURTON McCOLLUM.